United States Patent [19]

Vermaak

[11] Patent Number: 5,609,214
[45] Date of Patent: Mar. 11, 1997

[54] AGRICULTURAL MACHINE

[76] Inventor: Ruben H. Vermaak, 196 Leeupoort Street, Boksburg, Transvaal Province, South Africa

[21] Appl. No.: 374,952

[22] Filed: Jan. 19, 1995

[30] Foreign Application Priority Data

Jan. 20, 1994 [ZA] South Africa .......................... 94/0411

[51] Int. Cl.⁶ .................................................. A01B 49/00
[52] U.S. Cl. .......................... 172/311; 172/776; 172/214
[58] Field of Search .................................. 172/407, 413, 172/310, 311, 459, 460, 776, 284, 214, 215, 584, 282

[56] References Cited

U.S. PATENT DOCUMENTS

| | | | |
|---|---|---|---|
| 3,516,500 | 6/1970 | Butler | 172/282 |
| 3,990,521 | 11/1976 | Ankenman et al. | 172/311 |
| 4,026,365 | 5/1977 | Andersson et al. | 172/413 |
| 4,127,283 | 11/1978 | Baden | 172/310 |
| 4,157,735 | 6/1979 | Olsson et al. | 172/310 |
| 4,272,092 | 6/1981 | Johnson | 172/413 |
| 4,300,640 | 11/1981 | Baxter et al. | 172/413 |
| 4,619,330 | 10/1986 | Machnee | 172/459 |
| 4,703,810 | 11/1987 | Meiners | 172/413 |
| 4,715,172 | 12/1987 | Mosby | 172/311 |
| 5,078,216 | 1/1992 | Dick | 172/584 |
| 5,261,497 | 11/1993 | Snyder et al. | 172/284 |

FOREIGN PATENT DOCUMENTS 1401800 7/1975 United Kingdom .
2272621 5/1994 United Kingdom .

*Primary Examiner*—Terry Lee Melius
*Assistant Examiner*—Victor Batson
*Attorney, Agent, or Firm*—Marshall, O'Toole, Gerstein, Murray & Borun

[57] ABSTRACT

An agricultural machine to operate over a wide area in a single pass has a frame supported on swivelable land wheels which wheels are mounted on extensible shafts connected to the frame, the frame carrying at least two sub-frames rotatable relative to the frame in a horizontal plane and each sub-frame carrying at least two agricultural implements. The frame may be made in sections pivotally joined end to end to allow relative movement between the sections in a vertical plane.

5 Claims, 2 Drawing Sheets

AGRICULTURAL MACHINE

FIELD OF THE INVENTION

This invention relates to an agricultural machine which can be used to cultivate lands. More particularly, but not exclusively, the invention relates to a planter.

The term agricultural tool as used in this specification includes a planter unit, any type of harrow which can be used to cultivate lands, a rake, and a harvesting unit for harvesting crops.

BACKGROUND TO THE INVENTION

With the availability of bigger and stronger tractors, cultivators and planters have been made to cover larger areas during a single pass over the land.

A problem with cultivators and planters which cover a large width arises in turning these machines at the end of a land. The wider the extent of the cultivator or planter the larger the headland required at the end of the land for turning the machine to be able to move in the opposite direction. The headland required for turning the machine is wasted as it cannot be used for planting and growing agricultural products.

Planters have been built which consist of three sections, of which the outer sections can be tilted vertically when such a planter has to be turned in the headland. The overall width of such a planter is, however, limited by the width each section can be made having regard to mechanical constraints.

OBJECT OF THE INVENTION

It is an object of this invention to provide an agricultural machine which can cultivate or plant wide areas of land in a single pass. More particularly, but not exclusively, a further object of the invention is to provide a planter.

SUMMARY OF THE INVENTION

According to this invention there is provided an agricultural machine comprising a frame, a plurality of swivelable land wheels supporting the frame, at least two sub-frames which are at least partially rotatable relative to and secured to the frame with each of the sub-frames being arranged for supporting at least two agricultural tools.

Further features of the invention provide for the height of the frame above the ground to be adjustable, for the height to be adjustable and in particular, by means of hydraulic piston and cylinder arrangements, which are co-operable with telescopic supports of the land wheels. A still further feature of the invention provides for there to be four sub-frames, each of which is rotatable either through 180 degrees relative to the frame, or alternatively rotatable through 360 degrees relative to the frame.

Still further according to the invention there is provided for the agricultural tools to be planter units, or alternatively cultivator discs or tines, rakes or harvesting units.

Still further features of the invention provide for there to be at least one support wheel mounted to each sub-frame, and for the sub-frames to be rotatable relative to the frame by means of hydraulic piston and cylinder arrangements and also to be tiltable relative to the frame.

A still further feature of the invention provides for the frame to be made in multiple sections, which are pivotally secured to each other, to be movable relative to each other in a vertical plane. There is further provided for the sections of the frame to be biased towards alignment with each other by means of leaf springs or other suitable biasing means including cushioning means of suitable resilient materials.

A still further feature of the invention provides for the agricultural machine to be arranged to be pulled by a tractor. Alternatively there is provided for the agricultural machine to be self-propelled. In this regard hydraulic motors may be provided at at least some of the land wheels for driving these wheels.

A still further feature of the invention provides for the land wheels to be swivelable relative the supports by means of hydraulic piston and cylinder arrangements. This feature will enable the agricultural machine to be steerable.

Still further there is provided for the sub-frames to be interchangeable with sub-frames to which are secured different types of agricultural tools. The invention therefore provides that the agricultural machine may be used as a planter or a disc cultivator, for example. There may also be provided for the agricultural tools to be interchangeable on the sub-frames.

These and other features of the invention will be described in more detail below.

BRIEF DESCRIPTION OF THE DRAWINGS

An embodiment of the invention is described below, by way of example only, and with reference to the accompanying diagrammatic drawings in which.

DETAILED DESCRIPTION OF THE INVENTION WITH REFERENCE TO THE DRAWINGS

Figure 1:
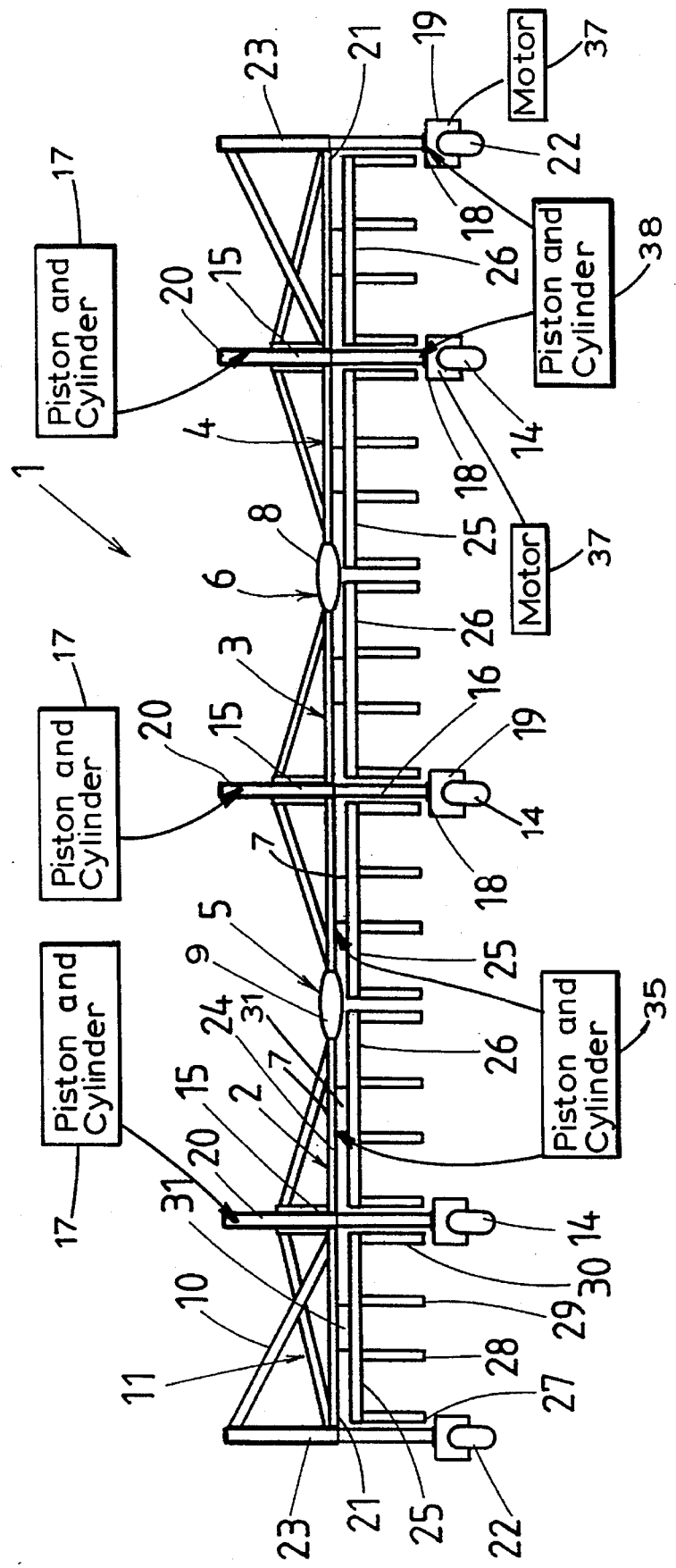
FIG. 1 is a schematic front view of an agricultural machine.

Referring to FIG. 1 an agricultural machine 1 is shown. This machine will preferably be a planter which can be used for planting maize and the like.

Figure 2:
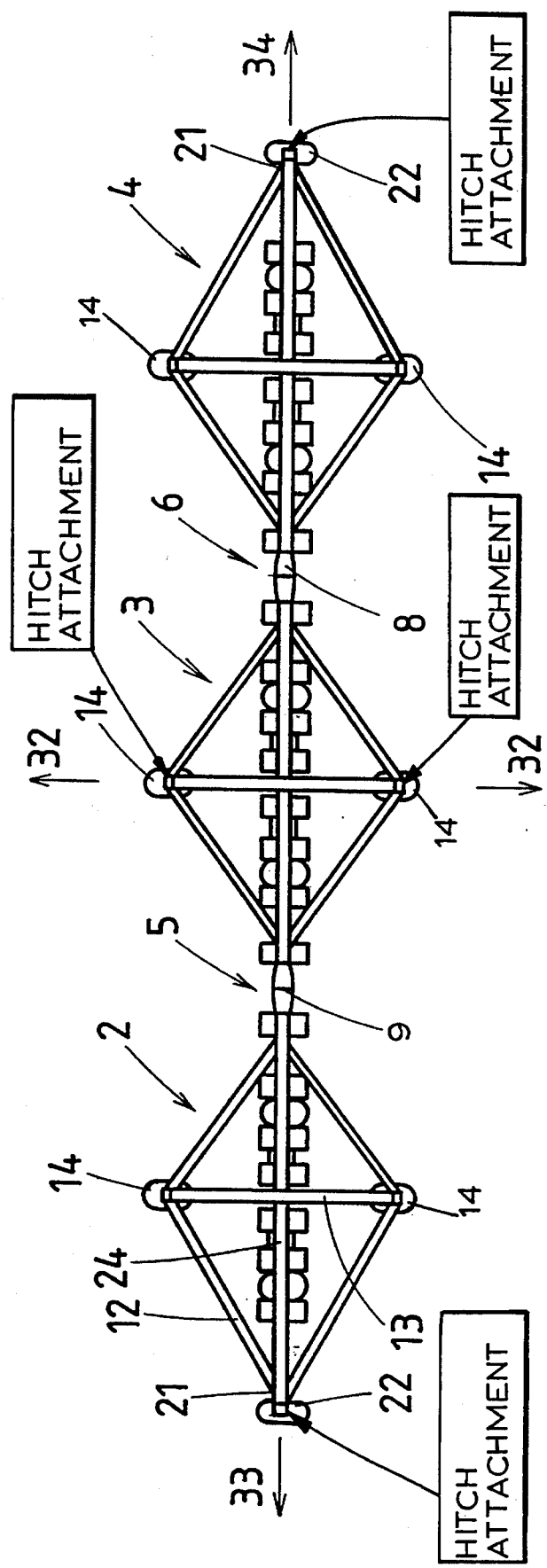
FIG. 2 is a schematic plan view of the machine shown in FIG. 1.

The machine has a frame which is made in three sections 2, 3 and 4. As shown in FIGS. 1 and 2, each section 2, 3, 4 of the frame includes a longitudinal beam 7. The beams 7 are pivotally connected to each other at 5 and 6 at the end of longitudinal beams 7 to allow for limited pivotable movement of the section 2, 3, and 4 relative to each other in a vertical plane. The sections 2, 3 and 4 of the frame are biased in horizontal alignment with each other by means of leaf spring assemblies 8 and 9. Many sections may be used to extend as long as is required for the machine to operate over as wide an area in a single pass as may be desired.

The frame has various bracing members of which only some are shown for illustration purposes at 10 and 11, for stability against flexing out of the horizontal plane and at 12 and 13 against twisting in the horizontal plane.

Each of the sections of the frame has a land wheel 14 secured to each of its forward and rearwardly extending ends as shown in FIG. 2 by means of telescopic supports 15. The inner member 16 of the telescopic support is secured via a bearing 18 to a yoke 19 in which are mounted the land wheels 14 in conventional manner.

Piston and cylinder arrangements (show only in FIG. 1) are located inside the outer telescopic member 20 to enable the height of the frame to be adjusted above a ground surface on which the land wheels rest. Adjustable stop members (not shown) are provided on the inner telescopic members 16. In use the outer telescopic members 20 will rest on these stop members when the frame is in a predetermined lowermost position. In this lowermost position the frame is therefore not supported by the piston and cylinder assemblies.

At each of the free outer ends 21 of the outer sections 2 and 4 of the frame a further land wheel 22 is provided which is secured by a telescopic support 23 to the respective section. The telescopic supports 23 also have piston and cylinder arrangements associated therewith. Sub-frames 25 and 26 are rotatably connected to each of the beams 7, which beams are connected together to form a central beam 24 extending the length of the frame. Each of the sub-frames 25 and 26 carry four agricultural tools 27, 28, 29 and 30.

These agricultural tools may, for example, be four planter units. The sub-frames 25 and 26 are pivotally secured to the separate sections of the central beam 24 by means of a hub arrangement 31 to swing in a horizontal plane. The hub arrangement 31 may also be arranged to be swivelable relative to the frame in a vertical plane to allow for unevenness of the land surface on which the machine is used.

Hydraulic piston and cylinder arrangements 35 (shown only in FIG. 1) are provided to rotate the sub-frames 25 and 26 on the frame. Hitching means 36 (shown only in FIG. 1) are provided to enable the agricultural machine to be pulled in the directions indicated by arrows 32, as well as in the direction of arrows 33 and 34. In use the agricultural machine can be drawn across a land in one direction of arrow 32. When the headland of the land is reached the piston and cylinder arrangements in the telescopic supports are activated to enable the height of the frame to be increased above the ground. The tools on the sub-frames 25 and 26 will therefore be lifted off the ground and the sub-frames can be rotated through 180 degrees. This rotation will preferably be done by hydraulic piston and cylinder arrangements.

The agricultural machine can then be moved in the direction of arrow 34 by means of a tractor, to the next section of the land which must be cultivated or planted. To enable this to be done the yokes 19 are provided in the form of casters so that the land wheels 14 and 22 can properly track the direction of pull applied to the machine. It can then be moved in the opposite direction of 32 by hitching the tractor at the other side of the machine.

The invention therefore provides an agricultural machine which covers a wide space in a single pass, but which can nevertheless be moved from one cultivating or planting sequence to the next in a relatively small headland.

The adjustability of the frame above the ground level will enable the agricultural machine to be used to cultivate crops of different heights.

It must be understood that numerous variations can be made to the above embodiment, the following of which are only given by way of example.

Different agricultural tools may be secured to the sub-frames. Planter units may be used, or alternatively, disc harrows or tine cultivators may be secured to the sub-frames. Sub-frames may also incorporate a rake, or any other conventional agricultural tool used to cultivate lands. Harvesting units may also be secured to the sub-frames. A conveyor may optionally be provided which extends along the length of the machine to convey harvested material from the harvesting units to an end of the machine.

The sub-frames may be removed from the frame and replaced by other sub-frames to which are secured different types of agricultural tools.

The structure of the frame is not indicated in detail as this will depend on the size and type of the agricultural machine.

The agricultural machine may further be made to be self-propelled. In this regard hydraulic drive motors 37 (shown only in FIG. 1) may be provided at some or all of the land wheels at the telescopic supports. A power source for such hydraulic motors and the other hydraulic piston and cylinder assemblies will be provided in conventional manner either from an independent motor or from a tractor power takeoff. In such an embodiment at least some of the land wheels will be made to be steerable such as by means of hydraulic piston and cylinder arrangements 38 (shown only in FIG. 1). In certain applications it may also be desirable for the land wheels to be positively steerable even in the embodiment which is built to be drawn by a tractor.

The feature of steerability can be important where different agricultural operations are carried out. For example the implement can be driven to traverse the crops at an inclination to the directions of the rows of crop plants. This is desirable for harvesting where cutting, raking and baling is necessary.

Further, where self-propelled and steerable, the machine can be made to traverse circular paths. This will facilitate the cultivation of crops grown under sprinkler irrigation systems which cover large circular areas.

Also it should be noted that when self propelled the driver's control unit will be made to swivel to face in the direction of travel.

Control wheels may also be provided to further support the sub-frames during use.

The invention particularly lends itself to allow for more or less sections of the frame to be added or removed to enable the overall width of the agricultural machine to be varied.

The actual design of the frame and the operation of the hydraulic piston and cylinder arrangements as well as the hydraulic drive motors are within the knowledge of those skilled in the art.

What is claimed is:

1. An agricultural machine comprising:

a frame;

a plurality of swivelable land wheels supporting the frame;

at least two sub-frames which are at least partially rotatable relative to and secured to the frame with each of the sub-frames being arranged for supporting at least two agricultural tools, and further including telescopic supports for at least some of the land wheels and hydraulic piston and cylinder arrangements for controlling the telescopic supports to vary the height of the frame above the ground; and bracing structures extending forwardly and rearwardly and above the frame with the land wheels positioned at the forward and rearward ends of the structures and at the ends of the frame.

2. An agricultural machine comprising:

a frame;

a plurality of swivelable land wheels supporting the frame;

telescopic supports for at least some of the land wheels and hydraulic piston and cylinder arrangements for controlling the telescopic supports to vary the height of the frame above the ground;

a plurality of sub-frames coupled to the frame and rotatable in a horizontal plane through substantially 180° relative to the frame, wherein each sub-frame is adapted for supporting a plurality of agricultural tools;

moving means for moving the agricultural machine in opposing first and second directions and further for moving the agricultural machine in opposing third and fourth directions transverse to the first and second directions; and bracing structures extending forwardly and rearwardly above the frame with the land wheels positioned at the forward and rearward ends of the structures and at the ends of the frame.

3. An agricultural machine as claimed in claim 2 in which hydraulic piston and cylinder arrangements are included to swivel at least some of the land wheels relative to the frame.

4. An agricultural machine as claimed in claim 2 including hitch attachments for connection to a tractor to pull the machine in at least two directions at right angles to each other.

5. An agricultural machine as claimed in claim 2 in which the frame is made in a plurality of sections pivotally secured together in an end-to-end relationship to permit limited relative movement of the sections in a vertical plane.

* * * * *